I. M. RHODES.
Gate.
No. 210,361. Patented Nov. 26, 1878.
Fig. 1.
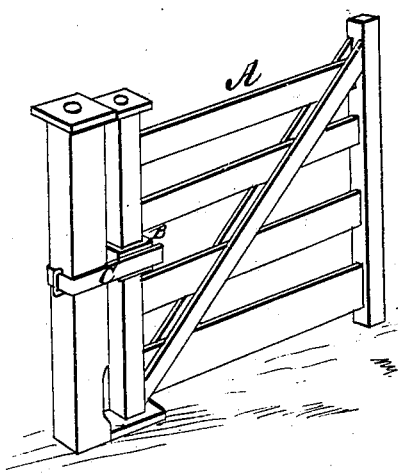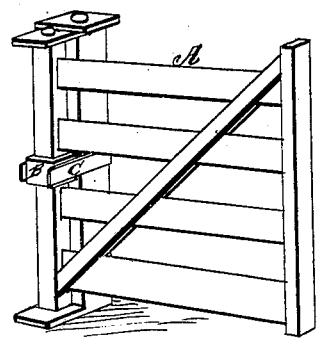
Fig. 2. Fig. 3.
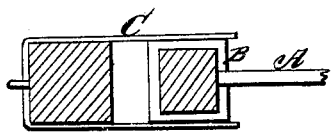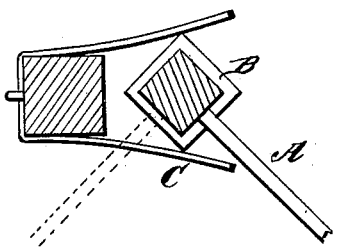
WITNESSES
Robert Everett
James J. Sheehy
INVENTOR.
Isaac M. Rhodes
By Gilmore, Smith & Co.
ATTORNEYS

UNITED STATES PATENT OFFICE.

ISAAC M. RHODES, OF HANCOCK, MICHIGAN.

IMPROVEMENT IN GATES.

Specification forming part of Letters Patent No. 210,361, dated November 26, 1878; application filed September 21, 1878.

*To all whom it may concern:*

Be it known that I, ISAAC M. RHODES, of Hancock, in the county of Houghton and State of Michigan, have invented a new and valuable Improvement in Gates; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a perspective of my gate, and Figs. 2 and 3 are sectional detail views of the same.

My invention relates to gates, and to means for holding the same in an open or closed position, as will be more fully hereinafter set forth.

Upon a swinging gate adapted to swing in both directions, suitably journaled above to the post and below to the sill, or hung to the post in any proper manner near the center, is a square collar, which collar is operated upon by a double spring, preferably made of one piece of steel, bent around and secured to the post and extending beyond the same, so as to clasp the collar closely on opposite faces. With the gate in a closed condition these springs clasp the two faces which are parallel with the plane of the gate. In opening the gate for the first forty-five degrees the spring exerts a resisting force, and for the next forty-five degrees assists in opening the gate, and when the gate has traversed ninety degrees the spring clasps the transverse face and holds the gate open.

I have shown an ordinary road-gate, formed of two swinging parts, pivoted in opposite directions, on each of which my invention is attached.

Referring to the drawings, A represents the gate, provided with collar B, and C represents the double spring.

From the foregoing the operation of my device is obvious.

What I claim as new, and desire to secure by Letters Patent, is—

The combination of the gate A, having square collar B, with the double spring C, adapted to clasp opposite faces of said collar in an open or closed position, as specified, for the purpose set forth.

In testimony that I claim the above I have hereunto subscribed my name in the presence of two witnesses.

ISAAC M. RHODES.

Witnesses:
JAMES J. SHEEHY,
ROBERT EVERETT.